(12) United States Patent
Lambin et al.

(10) Patent No.: US 8,062,507 B2
(45) Date of Patent: Nov. 22, 2011

(54) STRIPPING PROCESS WITH MULTI-SLOPED BAFFLES

(75) Inventors: Jason P. Lambin, New Lenox, IL (US); Keith A. Couch, Arlington Heights, IL (US); Paolo Palmas, Des Plaines, IL (US); Giovanni Spinelli, Lake in the Hills, IL (US)

(73) Assignee: UOP LLC, Des Plaines, IL (US)

( * ) Notice: Subject to any disclaimer, the term of this patent is extended or adjusted under 35 U.S.C. 154(b) by 602 days.

(21) Appl. No.: 12/237,703

(22) Filed: Sep. 25, 2008

(65) Prior Publication Data
US 2010/0075829 A1 Mar. 25, 2010

(51) Int. Cl.
*C10G 35/00* (2006.01)
*F27B 15/08* (2006.01)

(52) U.S. Cl. ........ 208/151; 208/150; 422/144; 422/145; 422/147; 502/34; 502/55

(58) Field of Classification Search .................. 208/150, 208/151; 422/144, 145, 147; 502/34, 55
See application file for complete search history.

(56) References Cited

U.S. PATENT DOCUMENTS

| | | | |
|---|---|---|---|
| 2,440,620 A | 4/1948 | Taff | 23/288 |
| 2,541,801 A | 2/1951 | Wilcox | 196/52 |
| 2,612,438 A | 9/1952 | Murphree | 23/288 |
| 2,994,659 A | 8/1961 | Slyngstad et al. | 208/113 |
| 3,894,932 A | 7/1975 | Owen | 208/74 |
| 4,364,905 A | 12/1982 | Fahrig et al. | 422/144 |
| 4,414,100 A | 11/1983 | Krug et al. | 208/153 |
| 4,481,103 A | 11/1984 | Krambeck et al. | 208/120 |
| 4,500,423 A | 2/1985 | Krug et al. | 208/161 |
| 4,689,206 A | 8/1987 | Owen et al. | 422/144 |
| 4,741,883 A | 5/1988 | Haddad et al. | 422/144 |
| 5,015,363 A | 5/1991 | Centinkaya | 208/150 |
| 5,043,055 A | 8/1991 | Owen et al. | |
| 5,112,576 A | 5/1992 | Kruse | 422/144 |
| 5,391,289 A | 2/1995 | Forde et al. | 208/113 |
| 5,910,240 A | 6/1999 | Senior et al. | |
| 6,126,905 A | 10/2000 | Wells | 422/144 |
| 6,162,402 A | 12/2000 | Lomas | 422/144 |
| 6,740,227 B2 | 5/2004 | Hedrick | 208/113 |
| 7,118,715 B1 | 10/2006 | Hedrick et al. | 422/144 |
| 7,276,210 B2 | 10/2007 | Cerqueira et al. | 422/144 |
| 2005/0040075 A1 | 2/2005 | Cerqueira et al. | |
| 2005/0205467 A1 | 9/2005 | Hedrick et al. | |

FOREIGN PATENT DOCUMENTS
WO WO 2007/094771 A1 8/2007

OTHER PUBLICATIONS
U.S. Appl. No. 12/237,729, filed Sep. 25, 2008, Jason P. Lambin et al.

*Primary Examiner* — Walter Griffin
*Assistant Examiner* — Lessanework Seifu
(74) *Attorney, Agent, or Firm* — James C. Paschall

(57) ABSTRACT

A process for stripping gases from catalyst material in which catalyst travels down baffles at a first acute angle and then at a second acute angle on the same baffle. Traveling down the baffle at the second angle assures the catalyst will cross a downcomer channel and land on an adjacent baffle.

16 Claims, 3 Drawing Sheets

STRIPPING PROCESS WITH MULTI-SLOPED BAFFLES

BACKGROUND OF THE INVENTION

This invention relates to processes for the fluidized contacting of catalyst with hydrocarbons. More specifically, this invention relates to processes for stripping entrained or adsorbed hydrocarbons from catalyst particles.

DESCRIPTION OF THE PRIOR ART

A variety of processes contact finely divided particulate material with a hydrocarbon containing feed under conditions wherein a fluid maintains the particles in a fluidized condition to effect transport of the solid particles to different stages of the process. Fluid catalytic cracking (FCC) is a prime example of such a process that contacts hydrocarbons in a reaction zone with a catalyst composed of finely divided particulate material. The hydrocarbon feed and inert diluent such as steam fluidize the catalyst and typically transports it in a riser as the catalyst promotes the cracking reaction. As the cracking reaction proceeds, substantial amounts of hydrocarbon, called coke, are deposited on the catalyst. A high temperature regeneration within a regeneration zone burns coke from the catalyst by contact with an oxygen-containing stream that again serves as a fluidization medium. Coke-containing catalyst, referred to herein as spent catalyst, is continually removed from the reaction zone and replaced by essentially coke-free catalyst from the regeneration zone.

A majority of the hydrocarbon vapors that contact the catalyst in the reaction zone are separated from the solid particles by ballistic and/or centrifugal separation methods within the reaction zone. However, the catalyst particles employed in an FCC process have a large surface area, which is due to a great multitude of pores located in the particles. As a result, the catalytic materials retain hydrocarbons within their pores, upon the external surface of the catalyst and in the spaces between individual catalyst particles. Although the quantity of hydrocarbons retained on each individual catalyst particle is very small, the large amount of catalyst and the high catalyst circulation rate which is typically used in a modern FCC unit results in a significant quantity of hydrocarbons being withdrawn from the reaction zone with the catalyst.

Therefore, it is common practice to remove, or strip, hydrocarbons from spent catalyst prior to passing it into the regeneration zone. Improved stripping brings economic benefits to the FCC process by reducing "delta coke". Delta coke is the weight percent coke on spent catalyst less the weight percent coke on regenerated catalyst. Reducing delta coke in the FCC process permits a lowering of the regenerator temperature. Consequently, more of the resulting, relatively cooler regenerated catalyst is required to supply the fixed heat load in the reaction zone. The reaction zone may therefore operate at a higher catalyst-to-feed or catalyst-to-oil (C/O) ratio. The higher C/O ratio increases conversion which increases the production of valuable products. Accordingly, improved stripping results in improved conversion. Additionally, stripping hydrocarbons from the catalyst also allows recovery of the hydrocarbons as products.

The most common method of stripping the catalyst involves passing a stripping gas, usually steam, through a flowing stream of catalyst, counter-current to its direction of flow. Such steam stripping operations, with varying degrees of efficiency, remove the hydrocarbon vapors which are entrained with the catalyst and adsorbed on the catalyst. Contact of the catalyst with a stripping medium may be accomplished in a simple open vessel as demonstrated by U.S. Pat. No. 4,481,103.

The efficiency of catalyst stripping is increased by using vertically spaced baffles to cascade the catalyst from side to side as it moves down a stripping apparatus and counter-currently contacts a stripping medium. Moving the catalyst horizontally increases contact between the catalyst and the stripping medium across the active fluidized surfaces of the trays so that more hydrocarbons are removed from the catalyst. In these arrangements, the catalyst is given a labyrinthine path through a series of baffles located at different levels. Catalyst and gas contact is increased by this arrangement that leaves no open vertical path of significant cross-section through the stripping apparatus. Further examples of these stripping devices for FCC units are shown in U.S. Pat. No. 2,440,620; U.S. Pat. No. 2,612,438; U.S. Pat. No. 3,894,932; U.S. Pat. No. 4,414,100 and U.S. Pat. No. 4,364,905. These references show the typical stripping vessel arrangement having a stripping vessel, a series of outer baffles in the form of frusto-conical sections that direct the catalyst inwardly onto a series of inner baffles. The inner baffles are centrally located conical or frusto-conical sections that divert the catalyst outwardly onto the outer baffles. The stripping medium enters from below the lower baffles and continues rising upwardly from the bottom of one baffle to the bottom of the next succeeding baffle. The baffle design typically contains steam jet nozzles on the top baffle and drilled holes on the remaining lower baffles to distribute the steam across the annulus between baffles to help ensure complete circumferential distribution of steam and to achieve maximum contact of steam with the catalyst. The outer diameter of the inner baffles are typically made smaller than the inner diameter of the outer baffles to facilitate construction. Variations in the baffles include the addition of skirts about the trailing edge of the baffle as depicted in U.S. Pat. No. 2,994,659 and the use of multiple linear baffle sections at different baffle levels as demonstrated in FIG. 3 of U.S. Pat. No. 4,500,423. A variation in introducing the stripping medium is shown in U.S. Pat. No. 2,541,801 where a quantity of fluidizing gas is admitted at a number of discrete locations. Baffles can also include an upstanding weir on the edge of the baffle adjacent the downcomer.

Accordingly, it is desirable to increase the efficiency of stripping in a baffle style stripping vessel by ensuring catalyst encounters all baffles in the stripping vessel.

BRIEF SUMMARY OF THE INVENTION

We have observed that catalyst can bypass baffles or portions of baffles in an FCC stripper vessels. Bypassing can occur when stripping fluid ascends along opposed walls of the stripping vessel while catalyst stays toward the middle between the opposed walls. The catalyst thus does not spread out on the baffles and is contacted with less stripping fluid diminishing stripping efficiency. This phenomenon is more prevalent in a larger stripping vessel because there is a greater distance between baffles and a greater horizontal distance across each baffle that the catalyst must traverse. The bypassing phenomenon may also be encountered when operating with lower catalyst flux due to insufficient momentum for cascading the catalyst stream from side to side. To prevent this bypassing we have invented a baffle with two faces. The second face extends into the downcomer channel between paired baffles. The second face directs the falling catalyst toward an adjacent baffle on the other side of the stripping vessel. The lower face facilitates transverse movement relative to the adjacent baffle to prevent baffle bypassing and increasing efficiency. Yet another advantage resulting from avoiding baffle bypassing is provision of a more uniform and higher bed density in the stripping vessel, which is particularly important to provide an adequate differential pressure across the slide valve in a conduit for transporting catalyst particles to a regenerator vessel.

Additional objects, embodiments, and details of this invention are given in the following detailed description of the invention.

DETAILED DESCRIPTION OF THE INVENTION

Figure 1:
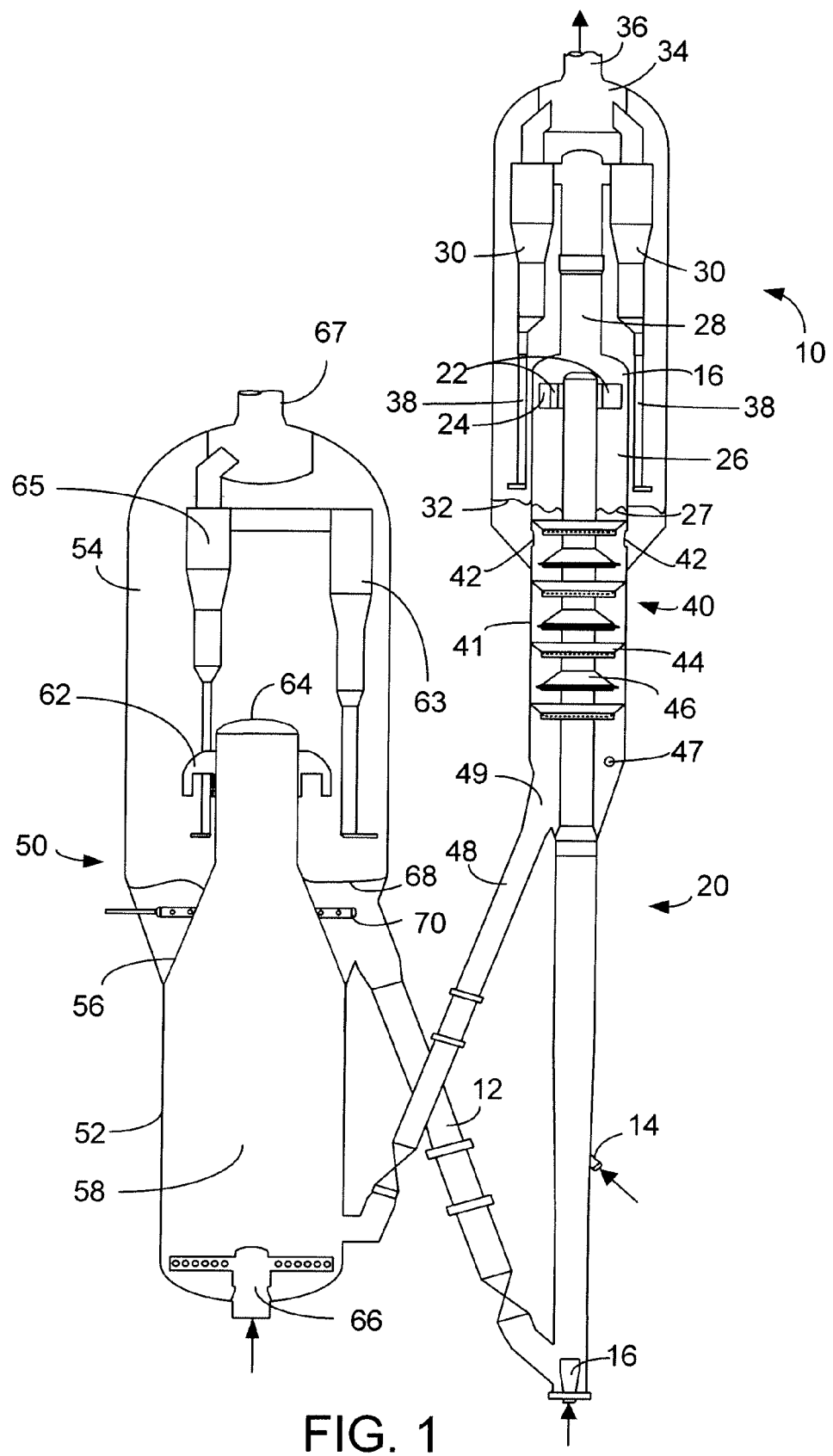
FIG. 1 shows a sectional elevation view of an FCC reactor and stripper arrangement in which the present invention may be incorporated.

The present invention will be described in the context of an FCC unit. However, other contexts may be applicable. FIG. 1 shows an FCC unit that includes a reactor vessel 10, a reactor riser 20 and a regenerator vessel 50. A regenerator standpipe 12 transfers catalyst particles from the regenerator vessel 50 at a rate regulated by a slide valve to a reactor riser 20 which may comprise a vertical conduit. A fluidization medium such as steam from a nozzle 16 transports catalyst upwardly through the reactor riser 20 at a relatively high density until a plurality of feed injection nozzles 14 (only one is shown) inject feed across the flowing stream of catalyst particles.

A conventional FCC feedstock or higher boiling hydrocarbon feedstock are suitable feeds. The most common of such conventional feedstocks is a "vacuum gas oil" (VGO), which is typically a hydrocarbon material having a boiling range of from 343 to 552° C. (649 to 1026° F.) prepared by vacuum fractionation of atmospheric residue. Such a fraction is generally low in coke precursors and heavy metal contamination which can serve to contaminate catalyst. Heavy hydrocarbon feedstocks to which this invention may be applied include heavy bottoms from crude oil, heavy bitumen from crude oil, shale oil, tar sand extract, deasphalted residue, products from coal liquefaction, atmospheric and vacuum reduced crudes. Heavy feedstocks for this invention also include mixtures of the above hydrocarbon streams and the foregoing list is not comprehensive.

The resulting mixture of catalyst and feed continues upwardly through the reactor riser 20 as the catalyst cracks the feed to lighter hydrocarbons while coke is deposited on the catalyst. At a top of the reactor riser 20 at least two disengaging arms 22 tangentially and horizontally discharge the mixture of product gas and spent catalyst from a top of the reactor riser 20 through ports 24 (only one is shown) into a disengaging section 26 of a stripping vessel 40 that effects partial separation of gases from the catalyst. The stripping vessel 40 is partially disposed in the reactor vessel 10. A transport conduit 28 carries the hydrocarbon vapors, including stripped hydrocarbons, stripping media and entrained catalyst from the stripping vessel 40 to one or more cyclones 30 in the reactor vessel 10 which further separates spent catalyst from the hydrocarbon vapor stream. A collection plenum 34 in the reactor vessel 10 gathers the separated hydrocarbon vapor streams from the cyclones 30 for passage to an outlet nozzle 36 and eventually into a fractionation recovery zone (not shown). Diplegs 38 discharge catalyst from the cyclones 30 into a bed 32 in a lower portion of the reactor vessel 10. The catalyst and adsorbed or entrained hydrocarbons in bed 32 eventually passes into a stripping vessel 40 across ports 42 defined in a wall 41 of the stripping vessel 40. Catalyst separated in the disengaging section 26 passes directly into a bed 27 above a lower portion of the stripping vessel 40. The stripping vessel 40 contains pairs of baffles comprising first baffles 44 and second baffles 46 to promote mixing between a stripping gas and the catalyst. The stripping gas, typically steam, enters a lower portion of the stripping vessel 40 through at least one inlet 47 to one or more distributors (not shown). The stripping gas travels upwardly counter-current to the cascading catalyst. The stripped spent catalyst leaves the stripping vessel 40 through a particle outlet 49 through a spent catalyst conduit 48 and passes into the regenerator vessel 50 at a rate regulated by a slide valve.

The reactor riser 20 of the FCC process is maintained at high temperature conditions which generally include a temperature above about 425° C. (797° F.). In an embodiment, the reaction zone is maintained at cracking conditions which include a temperature of from about 480° to about 590° C. (896 to 1094° F.) and a pressure of from about 69 to about 517 kPa (ga) (10 to 75 psig) but typically less than about 275 kPa (ga) (40 psig). The catalyst-to-oil ratio, based on the weight of catalyst and feed hydrocarbons entering the bottom of the riser, may range up to 20:1 but is typically between about 4:1 and about 10:1. Hydrogen is not normally added to the riser, although hydrogen addition is known in the art. In an embodiment, a substantial absence of added hydrogen, other than derived from the hydrocarbon feed, exists in the riser 20. Steam may be passed into the reactor riser 20 and reactor vessel 10 equivalent to about 4-7 wt-% of feed. The average residence time of catalyst in the riser may be less than about 5 seconds. The type of catalyst employed in the process may be chosen from a variety of commercially available catalysts. A catalyst comprising a zeolite base material is preferred, but the older style amorphous catalyst can be used if desired.

The regenerator vessel 50 may be a combustor type of regenerator, which may use hybrid turbulent bed-fast fluidized conditions in a high-efficiency regenerator vessel 50 for completely regenerating spent catalyst. However, other regenerator vessels and other flow conditions may be suitable for the present invention. The spent catalyst conduit 48 feeds spent catalyst to a first or lower chamber 52 defined by outer wall through a spent catalyst inlet chute. The spent catalyst from the reactor vessel 10 usually contains carbon in an amount of from 0.2 to 2 wt-%, which is present in the form of coke. Although coke is primarily composed of carbon, it may contain from 3 to 12 wt-% hydrogen as well as sulfur and other materials. An oxygen-containing combustion gas, typically air, enters the first chamber 52 of the regenerator vessel 50 through a conduit and is distributed by a distributor 66. Openings in the distributor 66 emit combustion gas. As the combustion gas enters a combustion section 58, it contacts spent catalyst entering from chute and lifts the catalyst at a superficial velocity of combustion gas in the first chamber 52 of at least 1.1 m/s (3.6 feet/second) under fast fluidized flow conditions. In an embodiment, the combustion section 58 will have a catalyst density of from 48 to 320 kg/m$^3$ (about 3 to 20 lb/ft$^3$) and a superficial gas velocity of 1.1 to 2.2 m/s (3.6 to 7.2 feet/second). The oxygen in the combustion gas contacts the spent catalyst and combusts carbonaceous deposits from the catalyst to at least partially regenerate the catalyst and generate flue gas.

The mixture of catalyst and combustion gas in the first chamber 52 ascend from the combustion section 58 through a frustoconical transition section 56 to the transport, riser section 60 of the first chamber 52. The riser section is defined by an outer wall to define a tube which is preferably cylindrical and extends preferably upwardly from the first chamber 52. The mixture of catalyst and gas travels at a higher superficial gas velocity than in the combustion section 58. The increased gas velocity is due to the reduced cross-sectional area of the riser section 60 relative to the cross-sectional area of the first chamber 52 below the transition section 56. Hence, the superficial gas velocity will usually exceed about 2.2 m/s (about 7.2 ft/s). The riser section 60 will have a lower catalyst density of less than about 80 kg/m³ (5 lb/ft³).

The regenerator vessel 50 also includes an upper or second chamber 54. The mixture of catalyst particles and flue gas is discharged from an upper portion of the riser section 60 into the second chamber 54. Substantially completely regenerated catalyst may exit the top of the transport, riser section 60, but arrangements in which partially regenerated catalyst exits from the first chamber 52 are also contemplated. Discharge is effected through a disengaging device 62 that separates a majority of the regenerated catalyst from the flue gas. In an embodiment, catalyst and gas flowing up the riser section 60 impact a top elliptical cap 64 of the riser section 60 and reverse flow. The catalyst and gas then exit through downwardly directed discharge inlets of disengaging device 62. The sudden loss of momentum and downward flow reversal cause a majority of the heavier catalyst to fall to the dense catalyst bed 68 and the lighter flue gas and a minor portion of the catalyst still entrained therein to ascend upwardly in the second chamber 54. Cyclones 63, 65 further separate catalyst from gas and deposits catalyst into dense bed. Flue gas exits the cyclones 63, 65 and collects in a plenum for passage to an outlet nozzle 67 of regenerator vessel 50 and perhaps into a flue gas or power recovery system (not shown). Downwardly falling disengaged catalyst collects in the dense catalyst bed 68. Catalyst densities in the dense catalyst bed 68 are typically kept within a range of from about 640 to about 960 kg/m³ (about 40 to 60 lb/ft³). A fluidizing conduit delivers fluidizing gas, typically air, to the dense catalyst bed 59 through a fluidizing distributor 70. In a combustor-style regenerator, approximately no more than 2% of the total gas requirements within the process enters the dense catalyst bed 68 through the fluidizing distributor 70. In this embodiment, gas is added here not for combustion purposes but only for fluidizing purposes, so the catalyst will fluidly exit through the standpipe 12. The fluidizing gas added through the fluidizing distributor 70 may be combustion gas. In the case where partial combustion is effected in the first chamber 52, greater amounts of combustion gas will be fed to the second chamber 54 through fluidizing distributor 70. Regenerated catalyst is returned through regenerator conduit 12 back to the reactor riser 20.

Figure 2:
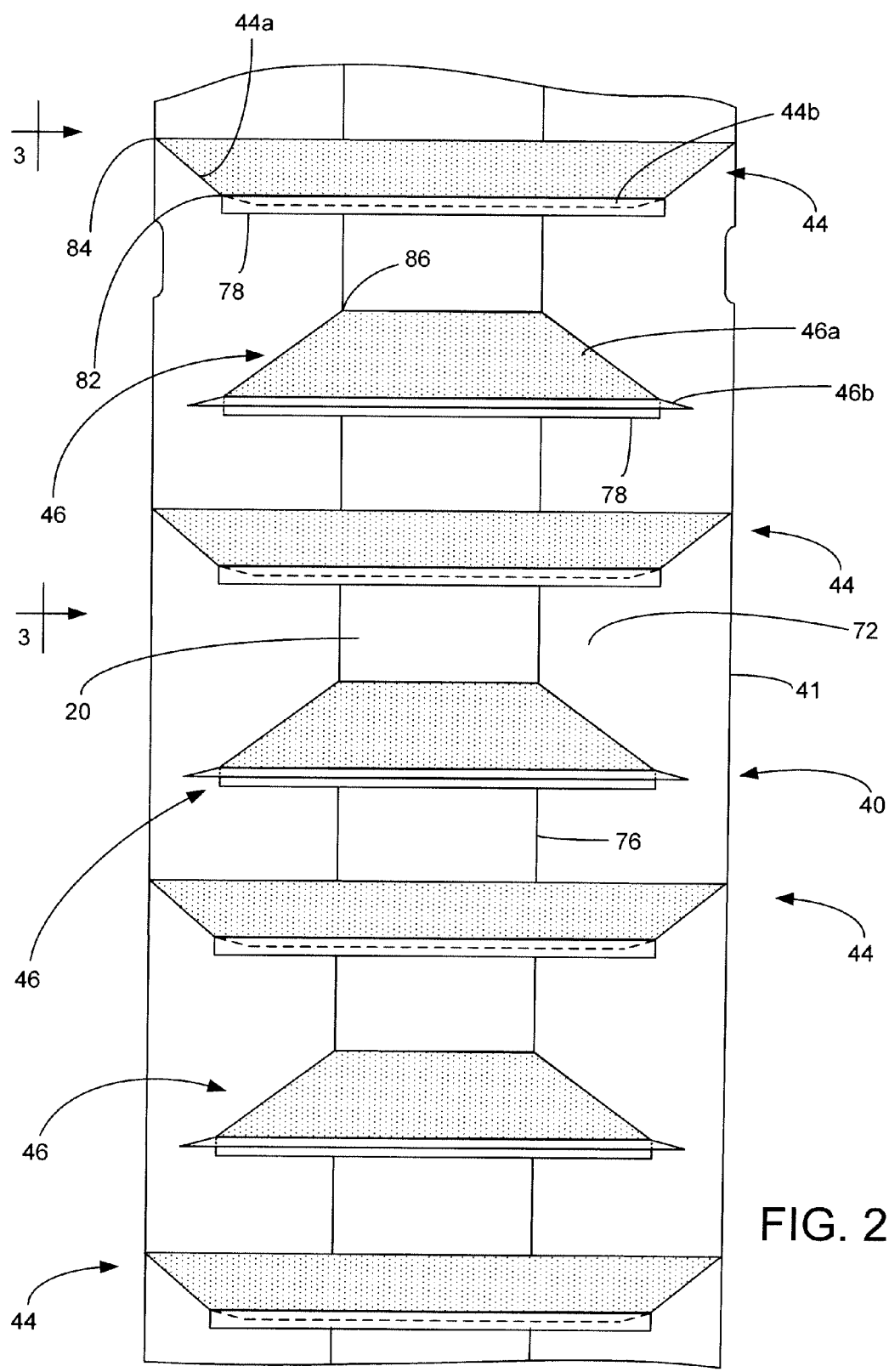
FIG. 2 is an enlarged section of the stripper section taken from FIG. 1.

FIG. 2 is an enlarged partial view of the stripping vessel 40 in FIG. 1. The plurality of pairs of first baffles 44 and second baffles 46, respectively, are spaced vertically over at least a portion of the stripping vessel 40. A first baffle 44 may be at a top of the plurality of baffles and at a bottom of the plurality of baffles. Increased stripper performance is usually obtained with an increased number of baffles. Certain feedstocks and operating conditions, the available length of the stripper for layout configurations or other equipment constraints may influence the number of baffles that may be incorporated into the stripper. At least one baffle and preferably the first baffles 44 include an upper or first face 44*a* and the second baffles 46 include a first or upper face 46*a*. The first faces 44*a* and 46*a* are generally angled or sloped with respect to vertical meaning they form an angle different than 180° from vertical. Providing a slope to the baffle ensures movement of the catalyst across the surface of the baffle. Generally, the baffles will have an acute angle of inclination from vertical of between 45° and 60°. Greater angles of the baffles with respect to vertical have the advantage of further maximizing the number of baffles that may be located in a given stripper length and providing less differential in the pressure head between the holes closer to the top edge and the holes closer to the bottom edge. Spacing between the baffles must provide sufficient flow area for cascading movement of the catalyst around the first and second baffles 44, 46. The baffles 44, 46 define a serpentine downcomer channel 72 along the length of the stripping vessel. The first face 44*a*, 46*a* provides the primary baffle surface and is therefore wider than the second face 44*b*, 46*b*. The baffles 44, 46 are alternatingly secured to opposing walls of the stripping vessel 40, so that travel from a superjacent baffle to a subjacent baffle requires the catalyst to travel across the downcomer channel 72.

An embodiment of an annular baffle configuration is shown in FIGS. 1 and 2. The invention is, however, also applicable to baffle configurations that are not annular as well. The reactor riser 20 extends through the stripping vessel 40. The first baffle 44 is supported by a wall 41 of the stripping vessel 40 and the lower baffles are supported by a wall 76 of the reactor riser 20. A secured edge 84 of the first face 44*a* of said first baffle 44 is secured to the wall 41 of the stripping vessel 40, and a secured edge 86 of the first face 46*a* of the second baffles 46 is secured to the wall 76 of the riser. A projecting edge of the first face 44*a* and projecting edge of the first face 46*a* project into the downcomer channel 72.

We have observed that in certain cases, especially in larger diameter stripping vessels and/or operation with low catalyst flux rates, stripping fluid ascends along opposed walls of the stripping vessel while catalyst channels down the middle of the annulus between the opposed walls. The catalyst does not have enough momentum to spread out on the baffles but only hits the projecting end of the baffles. Hence, the catalyst is contacted with less stripping fluid thereby diminishing stripping efficiency. To prevent the catalyst from bypassing baffles, the baffles include a second face 44*b*, 46*b* secured to the projecting edge of the first face 44*a*, 46*a*, respectively, which extends into the downcomer channel 72 between adjacent baffles. The second face 44*b*, 46*b* directs descending catalyst across the downcomer channel 72 to a vertical position above the subjacent baffle, preferably above the first face 46*a*, 44*a* of the subjacent baffle 46, 44. This arrangement significantly inhibits baffle bypassing.

In an embodiment, a skirt 78 may extend downwardly from the baffles 44, 46 and optionally at an intersection 82 between a secured edge of the second face 44*b*, 46*b* and the projecting edge of the first face 44*a*, 46*a*. The skirt 78 is typically vertical and depends from the bottom of the baffle 44, 46. The skirt 78 is provided to increase the pressure drop across the openings. In the embodiment of an annular stripper as shown in FIG. 2, each baffle comprises a circumferential band. Moreover, each face and skirt comprise a circumferential band.

Figure 3:
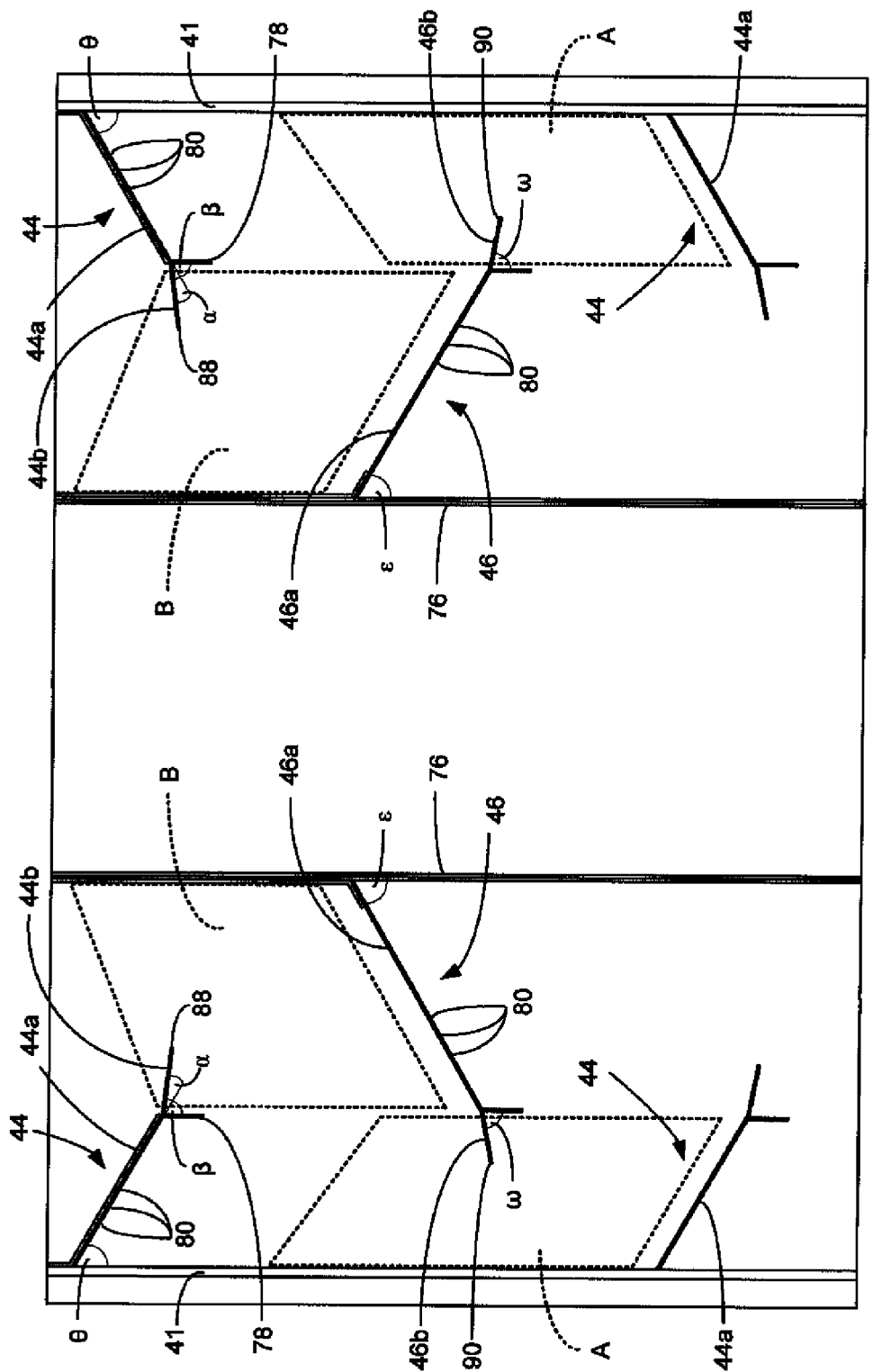
FIG. 3 is a partial sectional view taken along segment 3-3 of FIG. 2.

FIG. 3 is a partial side view along segment 3-3 in FIG. 2. FIG. 3 shows openings 80 in the baffles 44, 46 for fluidizing catalyst on the top side of the baffles. The openings are typically in the first face 44*a*, 46*a*, but are only optionally in the second face 44*b*, 46*b*. The second face 44*b*, 46*b* has a secured edge secured to the projecting edge of the first face 44*a*, 46*a* of the second baffle 44, 46, and the second face 44*b*, 46*b* has a projecting edge 88, 90, respectively. In an embodiment, the secured edge of the second face 44*b*, 46*b* is vertically positioned not over or out of vertical alignment with the subjacent baffle, and the projecting edge 88, 90 of the second face 44*b*, 46b is vertically aligned or positioned over the subjacent baffle. A vertical projection A of the first face 44a of the first baffle 44 and a vertical projection B of the first face 46a of the second baffle 46 are shown in FIG. 3. In an embodiment, the second face 44b, 46b of the first baffle and the second baffle 44, 46 extends toward the vertical projection B, A of an adjacent baffle 46, 44, and preferably the second face 44b, 46b extends into the vertical projection A, B of first face 44a, 46a of an adjacent baffle 46, 44.

The second face 44b, 46b is angled with respect to the first face 44a, 46a, respectively, which means they define an angle α with each other that is other than 180°. Preferably, the second face 44b defines a greater acute angle β up from vertical than an acute angle θ that the first face 44a defines up from the vertical, and the second face 46b defines a greater acute angle ω up from vertical than an acute angle ε that the first face 46a defines up from the vertical. In FIG. 3 verticals are exemplified by a wall 41 of the stripping vessel 40 for angle θ, by wall 76 of the riser for angle ε and by skirt 78 for β and ω. The length and slope of these angles from vertical may be optimized to obtain appropriate fluxes of catalyst.

The baffles 44, 46 may be coated with a refractory. FIG. 3 shows refractory covering inside surfaces of the walls at the top of the stripping vessel 40 and the first face 44a of the first baffle 44 and a portion of the first face 46a of the second baffle 46. The openings 80 may be formed by simply drilling holes through the base material of the baffles 44, 46. The baffles are typically formed from alloy steels that will stand up to the high temperature conditions. Such steels are often subject to erosion and the baffles may benefit from the use of inserts or nozzles to define the openings and provide resistance to the erosive conditions imposed by the circulation of catalyst over the top of the baffle. Furthermore, the baffles are routinely covered with a refractory material that provides additional erosion resistance.

In practice and referring to FIGS. 1-3, hydrocarbon feed is contacted with catalyst for catalytic cracking to provide a mixture of spent catalyst with coke deposits thereon and a converted feed of vaporous product of lighter hydrocarbons in reactor riser 20. The vaporous product is separated from the spent catalyst in the disengaging section 26 and reactor vessel 10 to produce a stream of separated catalyst particles containing hydrocarbons by adsorption and/or entrainment. The stream of separated catalyst particles are passed downwardly over the plurality of baffles 44, 46 in the stripping vessel 40. Stripping fluid such as steam is discharged from the inlet 47 underneath the baffles 44, 46. Openings 80 in the baffles 44, 46 admit stripping fluid to a top surface of the baffles 44, 46 to facilitate catalyst fluidization on the top surface of the baffles. At least some of the spent catalyst particles travel down the first face 44a of a first baffle 44 at a first acute angle θ up from vertical and then travel down a second face 44b of the first baffle 44 at a second acute angle β up from vertical. First acute angle θ and second acute angle β are different from each other. In an embodiment the second acute angle β is greater than the first acute angle θ. After the spent catalyst particles travel down the second face 44b of the first baffle 44, it traverses a downcomer channel 72 defined by the baffles and travel down the first face 46a of a second baffle 46 at a third acute angle ε up from vertical and then travels down the second face 46b of the second baffle 46 at a fourth acute angle ω up from vertical. In an embodiment, the third and fourth angle are different from each other. In an embodiment, the fourth angle ω is greater than the third angle ε. In an embodiment, the first angle θ and the third angle ε are equal, and in a further embodiment, the second angle β and the fourth angle ω are equal.

Stripping fluid and stripped hydrocarbons are recovered from the stripping vessel 40 through transport conduit 28, cyclones 30 and outlet nozzle 36. Stripped, spent catalyst is recovered through outlet 49 for passage through spent catalyst conduit 48 to the regenerator vessel 50. In the regenerator, the catalyst is regenerated by coke combustion, and regenerated catalyst is sent via regenerator conduit 12 to the reactor riser 20.

The invention claimed is:

1. A process for the stripping of entrained and/or adsorbed hydrocarbons from catalyst particles, said process comprising:
   contacting catalyst particles with a hydrocarbon stream;
   disengaging hydrocarbons from the catalyst particles after contact with said hydrocarbon stream to produce a stream of spent catalyst particles containing entrained and/or adsorbed hydrocarbons;
   passing the spent catalyst particles downwardly over a plurality of baffles;
   at least some of the spent catalyst particles traveling down a first face and a projecting edge of a first baffle at a first acute angle with respect to vertical and then traveling down a second face of said first baffle at a second acute angle with respect to vertical, said second face having a secured edge secured to said projecting edge of said first face and said second acute angle being different from the first acute angle;
   recovering stripping fluid and stripped hydrocarbons from the baffles; and
   recovering stripped catalyst particles from said baffles.

2. The process of claim 1 wherein the second acute angle is greater than the first acute angle.

3. The process of claim 1 wherein the spent catalyst particles traveling down said second face of said first baffle traverse a downcomer channel defined by said baffles and travel down a first face of an adjacent baffle at a third acute angle with respect to vertical and then travel down a second face of said second baffle at a fourth acute angle with respect to vertical, said fourth acute angle being different from the third acute angle.

4. The process of claim 3 wherein the first acute angle and the third acute angle are equal.

5. The process of claim 4 wherein the second and the fourth acute angle are equal.

6. A process for the stripping of entrained and/or adsorbed hydrocarbons from catalyst particles, wherein the entrained and/or adsorbed hydrocarbons are from the fluid catalytic cracking (FCC) of an FCC feed with a particulate material comprising an FCC catalyst, said process comprising:
   contacting an FCC feed with FCC catalyst to provide a mixture of FCC catalyst and FCC feed and to convert the FCC feed while depositing coke on the FCC catalyst;
   separating converted FCC feed from the FCC catalyst to produce a stream of separated catalyst particles containing hydrocarbons;
   passing the separated catalyst particle stream into a stripping vessel and passing the stream of catalyst particles downwardly over a plurality of baffles in the stripping vessel, at least some of the separated catalyst particles traveling down a first face and a projecting edge of a first baffle at a first acute angle with respect to vertical and then traveling down a second face of said first baffle at a second acute angle with respect to vertical, said second face having a secured edge secured to said projecting edge of said first face and said second acute angle being different from the first acute angle;

discharging a stripping fluid upwardly through a plurality of openings in said baffles;

recovering stripping fluid and stripped hydrocarbons that pass upwardly from the baffles;

recovering stripped FCC catalyst passing downwardly from the baffles;

passing stripped FCC catalyst to a regeneration vessel to remove coke from the FCC catalyst; and returning FCC catalyst from the regeneration vessel for contact with the FCC feed.

7. The process of claim 6 wherein the second acute angle is greater than the first acute angle.

8. The process of claim 6 wherein the spent catalyst particles traveling down said second face of said first baffle traverse a downcomer channel defined by said plurality of baffles and travel down a first face of a second baffle at a third acute angle with respect to vertical and then travel down a second face of said second baffle at a fourth acute angle with respect to vertical, said fourth acute angle being different from the third acute angle.

9. The process of claim 8 wherein the first acute angle and the third acute angle are equal.

10. The process of claim 8 wherein the second and the fourth acute angle are equal.

11. A process for the stripping of entrained and/or adsorbed hydrocarbons from catalyst particles, said process comprising:

contacting catalyst particles with a hydrocarbon stream;

disengaging hydrocarbons from the catalyst particles after contact with said hydrocarbon stream to produce a stream of spent catalyst particles containing entrained and/or adsorbed hydrocarbons;

passing the spent catalyst particles downwardly over a pair of baffles defining a downcomer channel therebetween;

at least some of the spent catalyst particles traveling down a first face of a first baffle and then traveling down a second face of said first baffle at an acute angle with respect to vertical, said second face extending toward said downcomer channel into a vertical projection of a second baffle;

recovering stripping fluid and stripped hydrocarbons from the baffles; and recovering stripped catalyst particles from said baffles.

12. The process of claim 11 wherein the acute angle at which catalyst particles travel down the second face is a second acute angle which is greater than a first acute angle at which catalyst particles travel down said first face with respect to vertical.

13. The process of claim 12 wherein the spent catalyst particles traveling down said second face of said first baffle traverse said downcomer channel and travel down a first face of a second baffle at a third acute angle with respect to vertical and then travel down a second face of said second baffle at a fourth acute angle with respect to the vertical.

14. The process of claim 13 wherein the first acute angle and the third acute angle are equal.

15. The process of claim 13 wherein the second and the fourth acute angle are equal.

16. The process of claim 13 wherein said fourth acute angle is different from the third acute angle.

* * * * *